US012003814B2

(12) United States Patent
Smith

(10) Patent No.: US 12,003,814 B2
(45) Date of Patent: Jun. 4, 2024

(54) SYSTEM FOR AUDIENCE SENTIMENT FEEDBACK AND ANALYSIS

(71) Applicant: STE Capital, LLC

(72) Inventor: Brian Smith, Weatherford, TX (US)

(73) Assignee: STE Capital, LLC, Austin, TX (US)

( * ) Notice: Subject to any disclaimer, the term of this patent is extended or adjusted under 35 U.S.C. 154(b) by 240 days.

(21) Appl. No.: 17/717,775

(22) Filed: Apr. 11, 2022

(65) Prior Publication Data
US 2022/0345779 A1 Oct. 27, 2022

Related U.S. Application Data

(60) Provisional application No. 63/178,246, filed on Apr. 22, 2021.

(51) Int. Cl.
H04N 21/442 (2011.01)
(52) U.S. Cl.
CPC ............................ H04N 21/44218 (2013.01)
(58) Field of Classification Search
None
See application file for complete search history.

(56) References Cited

U.S. PATENT DOCUMENTS

| | | | |
|---|---|---|---|
| 7,899,700 B2 | 3/2011 | Floyd et al. | |
| 8,073,013 B2 | 12/2011 | Coleman et al. | |
| 9,044,183 B1 | 6/2015 | Karam | |
| 9,332,315 B2 | 5/2016 | Agrawal | |
| 9,848,240 B2 | 12/2017 | Davis et al. | |
| 10,783,539 B2 | 9/2020 | Frank et al. | |
| 2009/0133047 A1* | 5/2009 | Lee | A61B 5/6814 725/10 |
| 2012/0191774 A1 | 7/2012 | Bhaskaran et al. | |
| 2013/0232516 A1 | 9/2013 | Paull | |
| 2013/0247081 A1* | 9/2013 | Vinson | H04N 21/254 725/14 |
| 2013/0265314 A1* | 10/2013 | Laughlin | H04N 21/25866 345/440 |
| 2014/0172848 A1* | 6/2014 | Koukoumidis | G06F 16/78 707/736 |
| 2014/0282651 A1* | 9/2014 | Baratz | H04N 21/222 725/13 |
| 2014/0337097 A1* | 11/2014 | Farlie | G06Q 30/0203 705/7.32 |
| 2016/0180361 A1 | 6/2016 | Farlie | |
| 2016/0212466 A1 | 7/2016 | Nauseef et al. | |
| 2016/0241533 A1 | 8/2016 | Bist et al. | |
| 2017/0251262 A1* | 8/2017 | Bist | H04N 21/6582 |
| 2018/0197189 A1 | 7/2018 | Eisner et al. | |
| 2018/0349483 A1 | 12/2018 | Carlisle et al. | |
| 2019/0090020 A1* | 3/2019 | Srivastava | G11B 27/28 |

(Continued)

Primary Examiner — Alexander Q Huerta
(74) Attorney, Agent, or Firm — NEO IP

(57) ABSTRACT

The present invention is directed to a system for providing audience sentiment responses to an event and/or an item of media content. The audience sentiment responses are divided into at least four categories, including sentiments liking and disliking the event and/or the media content, and sentiments desiring more or less of the event and/or the media content. The system further provides analytics regarding audience sentiments, such as the times during the event and/or the points in the media content wherein audiences experienced the greatest shifts in one or more of the sentiment types.

20 Claims, 15 Drawing Sheets

(56) References Cited

U.S. PATENT DOCUMENTS

2021/0142354 A1* 5/2021 Cao .................... H04N 21/4784
2022/0279240 A1* 9/2022 Vella .................. H04N 21/4312
2023/0342822 A1* 10/2023 Bhan ..................... G06F 40/289

* cited by examiner

SYSTEM FOR AUDIENCE SENTIMENT FEEDBACK AND ANALYSIS

CROSS REFERENCE TO RELATED APPLICATIONS

This application relates to and claims priority from the following applications. This application claims the benefit of U.S. Provisional Patent Application No. 63/178,246, filed Apr. 22, 2021, which is incorporated herein by reference in its entirety.

BACKGROUND OF THE INVENTION

1. Field of the Invention

The present invention relates to providing feedback to a speaker or content creator as well as a viewing audience, and more specifically to audience sentiment visual representation in response to content.

2. Description of the Prior Art

It is generally known in the prior art to provide methods to provide feedback on media, including like and dislike indicators. It is further known to provide analytics regarding the viewership of recorded video content, including the number of views, average watch time per viewer, age of viewers, number of likes, number of dislikes, number of comments, number of shares, and place of origin of viewers.

Prior art patent documents include the following:

US Patent Publication No. 2013/0265314 for Method and apparatus for capturing and analyzing real-time user sentiment for an event by inventor Laughlin, filed Apr. 9, 2013 and published Oct. 10, 2013, discloses collection and analysis of real-time reactions of a large audience during an event. For example, one method includes collecting responses to an event from a plurality of user devices and linking a timestamp associated with each individual response to a corresponding point of time in the event. Each individual response indicates either a positive user response or a negative user response. The method also includes compiling a subset of the responses having one or more demographic factors in common and displaying a graph of the subset as a function of time with respect to the event.

U.S. Pat. No. 9,044,183 for Intra-video ratings by inventor Karam, filed Jan. 31, 2012 and issued Jun. 2, 2015, discloses receiving and displaying voting data with respect to online hosted videos. Viewers vote on portions within various videos stored in an online video hosting website. Voting data can represent different types of votes, such as unipolar, bipolar, or categorical. The prior voting data, including that submitted by other viewers, can be displayed in a number of ways, such as gradations of color, or charts such as bar graphs. The voting data may be associated with demographic categories, such as a voter's age, sex, or political affiliation. Further, a video may be selectively played to display portions of most interest to given demographic categories, as indicated by voting patterns of those categories.

US Patent Publication No. 2016/0212466 for Automatic system and method for determining individual and/or collective intrinsic user reactions to political events by inventors Nauseef et al., filed Jan. 21, 2016 and published Jul. 21, 2016, discloses a video content server for: receiving, using a communication unit, a video stream of a user of a user device; analyzing, using a graphical processing unit (GPU), the video stream in real time; identifying, using a recognition unit, at least one object of interest comprised in the video stream; assigning, using a gesture analysis unit, at least one numerical value associated with at least one predetermined emotion to the at least one object of interest; and generating, using a reporting unit, a score indicating relevance of political content to the user based at least in part on the at least one numerical value.

US Patent Publication No. 2018/0197189 for System and Method for Profiling Media by inventors Eisner et al., filed Jan. 6, 2018 and published Jul. 12, 2018, discloses a method and system for evaluating media files for use in marketing and advertisements. An audio segment is provided to a number of survey participants. Each survey participant reviews the media file and selectively inputs perceived psychological attributes and their degree. This information is timestamped and recorded, and then combined with other survey participants' responses to compile a score for a variety of psychological attributes which tend to be invoked by the media file. The user may view a dashboard and which indicates the results for their media file relative to a set of media files, so that the user, may, for instance, select media files displaying certain criteria. In certain embodiments, objective data regarding media segments as well as past rated media files may be used to predict scoring for new media files.

US Patent Publication No. 2013/0232516 for Method and Apparatus for Collection and Analysis of Real-Time Audience Feedback by inventor Paull, filed Mar. 1, 2012 and published Sep. 5, 2013, discloses a viewer sentiment collection and analysis system providing a user interface to collect information during the performance or display of a media program. Sentiment indications are collected periodically, during the program, and recorded with information to permit the instantaneous indications to be associated with particular parts of the program.

US Patent Publication No. 2012/0191774 for Virtual dial testing and live polling by inventors Bhaskaran et al., filed Jan. 25, 2012 and published Jul. 26, 2012, discloses a virtual polling system allowing a dial testing style of polling to occur at multiple locations and to include more respondents than a traditional dial test. In one embodiment, the system is implemented using an application component that can be run on multiple mobile or other devices and a server component that collects information from the mobile devices to provide relevant data analysis. The system provides an application that each potential respondent can run on the respondent's device of choice. The application displays a virtual dial, slider, or other user interface control that allows the respondent to indicate positive or negative sentiment, or any other response range designed by the pollster. The respondent can move the slider in real time while watching an event to indicate the respondent's impression of the event. The server component collects response information from each device and performs analysis requested by the pollster.

US Patent Publication No. 2016/0241533 for System and Method for Granular Tagging and Searching Multimedia Content Based on User's Reaction by inventors Bist et al., filed Nov. 16, 2015 and published Aug. 18, 2016, discloses a system and a method for tagging content based on individual cues, emotional score or emotional profile, where the content is a video file, a webpage, a mobile application, a product review or product demo video. The method involves authorizing a user to access the content; capturing a user specific data, an application details and a content specific data in response to the content in real-time; analyzing the captured user specific data, the application detail and the content specific data to generate a user emotional profile; and tagging the user emotional profile with the content in a time granular manner.

U.S. Pat. No. 8,073,013 for Method and apparatus for collecting survey data via the Internet by inventors Coleman et al., filed Mar. 1, 2006 and issued Dec. 6, 2011, discloses a method and apparatus for conducting a survey independent of location and participant schedules. An exemplary method of the invention comprises sending a multi-media data file to a plurality of survey participants, receiving reactionary feedback from a plurality of participants via a wide area network, and compiling the reactionary feedback to generate the survey results. Subsequently, a viewer synchronously displays the compiled survey results with the corresponding streamed media from the multi-media data file.

U.S. Pat. No. 9,848,240 for Assessing digital content across a communications network by inventors Davis et al., filed Oct. 12, 2016 and issued Dec. 19, 2017, discloses a method of providing an on-line assessment of digital content, such as video clips, across a network, such as the Internet. In general terms the steps involved in this embodiment of the methodology include: 1. presenting a stimulant video clip; 2. providing means for rating the video clip in real time, in this example a rating bar and slider driven by a computer peripheral device; 3. collecting rating data relevant to the viewed video clip.

U.S. Pat. No. 7,899,700 for Method and system for providing multi-dimensional feedback by inventors Floyd et al., filed Sep. 29, 2006 and issued Mar. 1, 2011, discloses a method and system for receiving multi-dimensional feedback in a survey comprising a participant interface module and a data analysis module. The participant interface module comprises a display of a media and a plurality of interactive indicators. Each of the plurality of interactive indicators can receive feedback from at least one participant according to a dimension and a time of the feedback. The data analysis module receives and processes the feedback to generate a result which may be graphically displayed. The result may comprise the processed feedback with the media according to the two or more dimensions and the time of the feedback.

U.S. Pat. No. 9,332,315 for Timestamped commentary system for video content by inventor Agrawal, filed Sep. 20, 2013 and issued May 3, 2016, discloses a video commentary system receiving video content items from users in a community. Such video content items are presented to viewers in the community. The system presents submission controls through which the viewers can submit feedback related to specific time points within that presentation. The controls can be used to submit textual, video, or audio comments. The controls can include labeled buttons that viewers can activate to submit categorized comments. Each submission is associated with a timestamp corresponding to the current video frame. The user interface includes regions that display, in real-time, the submissions received from the viewers. Submissions can indicate their timestamps. A bar graph indicates, by category and by time interval, quantities of categorized comments that have been received relating to various time intervals in the presentation.

U.S. Pat. No. 10,783,539 for Incentive-based crowdvoting using a blockchain by inventors Frank et al., filed Apr. 27, 2019 and issued Sep. 22, 2020, discloses an instant operation including one or more of creating a smart contract identifying content and review requirements for performing a review of the content, signing and validating the smart contract, storing the smart contract in a blockchain, receiving content review feedback from one or more reviewers of the content, and amending the blockchain to include the content review feedback.

SUMMARY OF THE INVENTION

The present invention relates to providing feedback to a speaker or a content creator as well as the viewing audience, and more specifically to sentiment visual representation of audience responses to content.

It is an object of this invention to provide analytics to speakers and/or content creators as well as the audience to understand how an audience is feeling and responding to an event or an item of recorded media content, such that the speakers and/or the content creators are better able to tailor content to their respective audiences.

In one embodiment, the present invention is directed to a system for analyzing audience response to media, including at least one node, each including a processor and a memory, in network communication with a plurality of user devices, wherein a digital overlay is generated over a media content item displayed on each of the plurality of user devices, wherein the at least one node is operable to receive sentiment data through the digital overlay from a subset of the plurality of user devices, wherein the at least one node is operable to update one or more distributed ledgers based on the sentiment data, wherein the at least one node is operable to transmit updates of the one or more distributed ledgers to the plurality of user devices, and wherein the sentiment data includes one or more of at least four sentiments expressed regarding the media content item, an identifier of the media content item, and at least one timestamp associated with the one or more of the at least four sentiments.

In another embodiment, the present invention is directed to a system for analyzing audience response to media, including at least one node, each including a processor and a memory, in network communication with a plurality of user devices, wherein a digital overlay is generated over at least one media content item displayed on each of the plurality of user devices, wherein the at least one node is operable to receive sentiment data through the digital overlay from a subset of the plurality of user devices, wherein the at least one node is operable to update one or more distributed ledgers based on the sentiment data, wherein the at least one node is operable to transmit updates of the one or more distributed ledgers to the plurality of user devices, wherein the sentiment data includes one or more of at least four sentiments expressed regarding the at least one media content item, and wherein an artificial intelligence module is operable to indicate popular content topics for each creator of the at least one media content item based on the sentiment data.

In yet another embodiment, the present invention is directed to a system for analyzing audience response to media, including at least one node, each including a processor and a memory, in network communication with a plurality of user devices, wherein a digital overlay is generated over a media content item displayed on each of the plurality of user devices, wherein the at least one node is operable to receive sentiment data through the digital overlay from a first subset of the plurality of user devices, wherein the at least one node is operable to update one or more distributed ledgers based on the sentiment data, wherein the at least one node is operable to transmit updates of the one or more distributed ledgers to the plurality of user devices, wherein the sentiment data includes one or more of at least four sentiments expressed regarding the media content item, and wherein the sentiment data includes physiological data automatically generated by at least one sensor attached to the plurality of user devices.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 7 illustrates a content overview page in a list view according to one embodiment of the present invention.

FIG. 11 illustrates a sentiment detail page according to one embodiment of the present invention.

FIG. 13 illustrates an administrator request page according to one embodiment of the present invention.

FIG. 14 illustrates an administrator reporting page according to one embodiment of the present invention.

DETAILED DESCRIPTION

Figure 1:
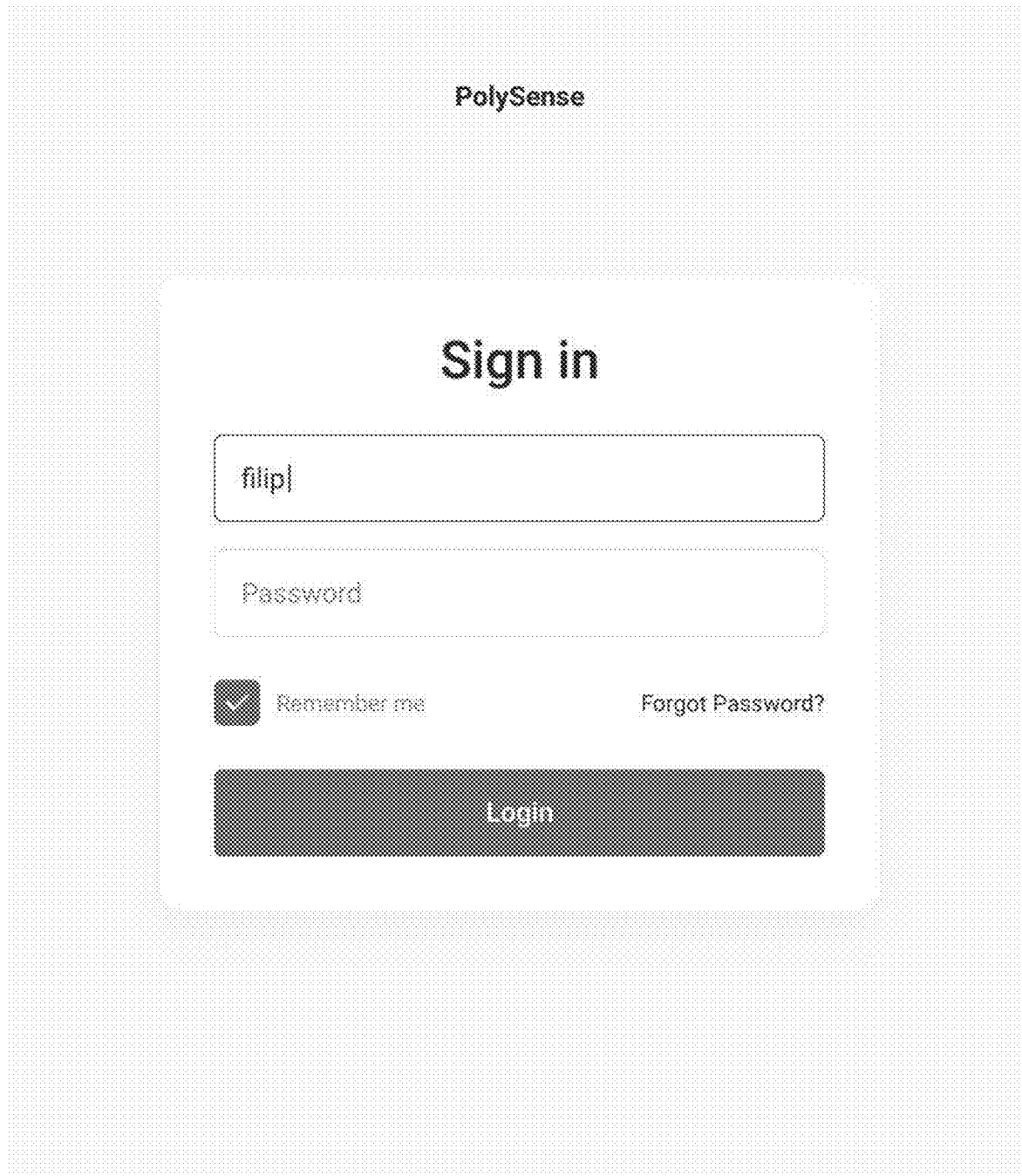
FIG. 1 illustrates a sign in screen according to one embodiment of the present invention.

The present invention relates to providing feedback to a speaker or a content creator as well as the audience, and more specifically to sentiment visual representation of audience responses to content.

In one embodiment, the present invention is directed to a system for analyzing audience response to media, including at least one node, each including a processor and a memory, in network communication with a plurality of user devices, wherein a digital overlay is generated over a media content item displayed on each of the plurality of user devices, wherein the at least one node is operable to receive sentiment data through the digital overlay from a subset of the plurality of user devices, wherein the at least one node is operable to update one or more distributed ledgers based on the sentiment data, wherein the at least one node is operable to transmit updates of the one or more distributed ledgers to the plurality of user devices, and wherein the sentiment data includes one or more of at least four sentiments expressed regarding the media content item, an identifier of the media content item, and at least one timestamp associated with the one or more of the at least four sentiments.

In another embodiment, the present invention is directed to a system for analyzing audience response to media, including at least one node, each including a processor and a memory, in network communication with a plurality of user devices, wherein a digital overlay is generated over at least one media content item displayed on each of the plurality of user devices, wherein the at least one node is operable to receive sentiment data through the digital overlay from a subset of the plurality of user devices, wherein the at least one node is operable to update one or more distributed ledgers based on the sentiment data, wherein the at least one node is operable to transmit updates of the one or more distributed ledgers to the plurality of user devices, wherein the sentiment data includes one or more of at least four sentiments expressed regarding the at least one media content item, and wherein an artificial intelligence module is operable to indicate popular content topics for each creator of the at least one media content item based on the sentiment data.

In yet another embodiment, the present invention is directed to a system for analyzing audience response to media, including at least one node, each including a processor and a memory, in network communication with a plurality of user devices, wherein a digital overlay is generated over a media content item displayed on each of the plurality of user devices, wherein the at least one node is operable to receive sentiment data through the digital overlay from a first subset of the plurality of user devices, wherein the at least one node is operable to update one or more distributed ledgers based on the sentiment data, wherein the at least one node is operable to transmit updates of the one or more distributed ledgers to the plurality of user devices, wherein the sentiment data includes one or more of at least four sentiments expressed regarding the media content item, and wherein the sentiment data includes physiological data automatically generated by at least one sensor attached to the plurality of user devices.

Traditionally, content providing websites, whether the content be live or recorded, only allow viewers to react positively or negatively, or with a rating reflecting the content's quality on a bipolar scale (e.g., 10/10 indicating high quality and 1/10 indicating low quality). However, audience reactions are more complicated than mere binary positive or negative feelings. For example, an audience might be disgusted by a particular video, but also want to see more of it. Similarly, an audience could say that a particular video is funny, but that they want to see different types of things.

From a content creator perspective, simply seeing if an audience has positive or negative feelings regarding a particular piece of content is often inadequate to inform the creator as to how they should produce content in the future. For example, audiences often like something toward the beginning of a video and care less about or actively dislike other parts about the video. Simply indicating at what point during the video the audience chose to like or dislike the video is also inadequate. For example, if an audience finds a part at the beginning of the video particularly funny, they often forget to react to the content during that portion and are likely to provide the reaction when the enjoyable content is already finished, potentially skewing how the creator chooses to make videos in the future. Therefore, there is a need for an audience feedback system that provides more detailed thoughts about how an audience feels about particular content and what parts of the content in particular they have those feelings about.

Referring now to the drawings in general, the illustrations are for the purpose of describing one or more preferred embodiments of the invention and are not intended to limit the invention thereto.

The system according to the present invention includes a plurality of nodes, each including a processor and a memory. The plurality of nodes are operable to receive data, including sentiment data, from a plurality of sending user devices, and transmit sentiment data to a plurality of receiving user devices. Each of the plurality of nodes are operable to aggregate data transmitted from the plurality of sending user devices, automatically update one or more distributed ledgers based on the data, and then transmit the one or more updated distributed ledgers to the plurality of receiving user devices. Examples of devices able to serve as nodes according to the present invention include mobile phones, edge computing devices, servers, personal computers, and/or other devices having a processor and memory. In one embodiment, the plurality of nodes are operable to receive data from the plurality of user devices over one or more wireless personal area networks (e.g., BLUETOOTH networks) and/or one or more wireless local area networks (e.g., WI-FI networks). In one embodiment, the sentiment data includes one or more sentiments expressed regarding a content item, an identifier of the content item, and/or at least one timestamp associated with the one or more sentiments FIG. 1 illustrates a sign in screen according to one embodiment of the present invention. Users of the system have an associated profile. In one embodiment, the system enables users to log in to view their profile using a username and/or an email address and an associated password. In one embodiment, the system receives an input from the user regarding whether the browser should remember the user. If an option is selected allowing the browser to remember the user, then the user will automatically be logged on during subsequent visits to the site using that browser or the log-in information will be automatically filled in to the sign in screen when the user subsequently visits the site. In another embodiment, the system generates an authentication module when the user attempts to log-in to view their profile. In one embodiment, the authentication module requires biometric authentication (e.g. fingerprint, facial, or iris identification), behavioral authentication (e.g. typing pattern testing), completion of a completely automated public Turing test to tell computers and humans apart (CAPTCHA), and/or successful answering of challenge questions in order for a user to successfully log-in.

Figure 2:
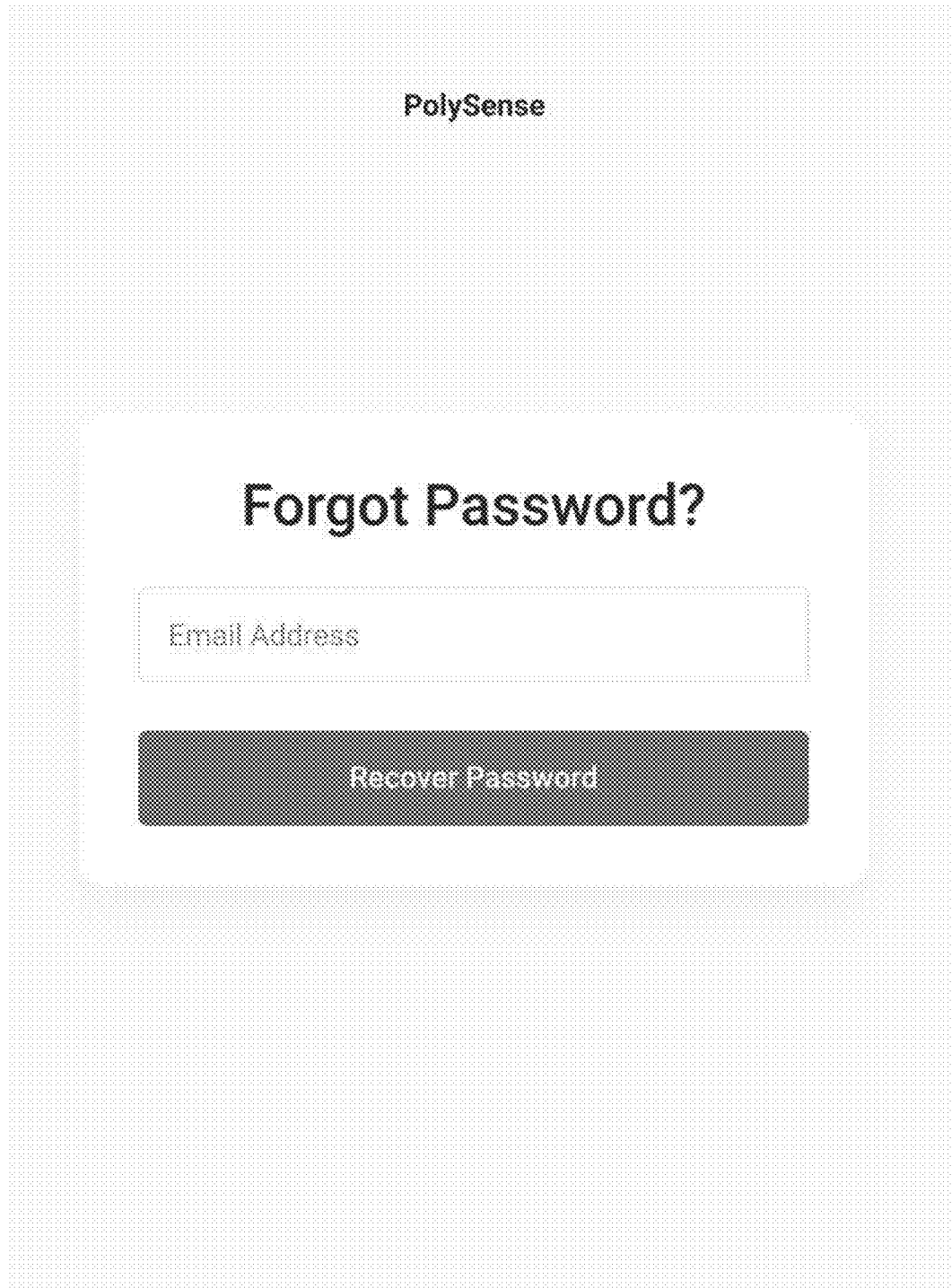
FIG. 2 illustrates a password retrieval screen according to one embodiment of the present invention.

FIG. 2 illustrates a password retrieval screen according to one embodiment of the present invention. At the sign in screen, the system is able to receive a request to access a password retrieval module. The system enables users to input a method of communication, including but not limited to an email address, a phone number, a social media account, and/or a physical address. If the method of communication matches a method of communication associated with an existing account, then the system will send the password for the account via the chosen method of communication and/or send a link to a page in which a new password for the account is able to be entered.

Figure 3:
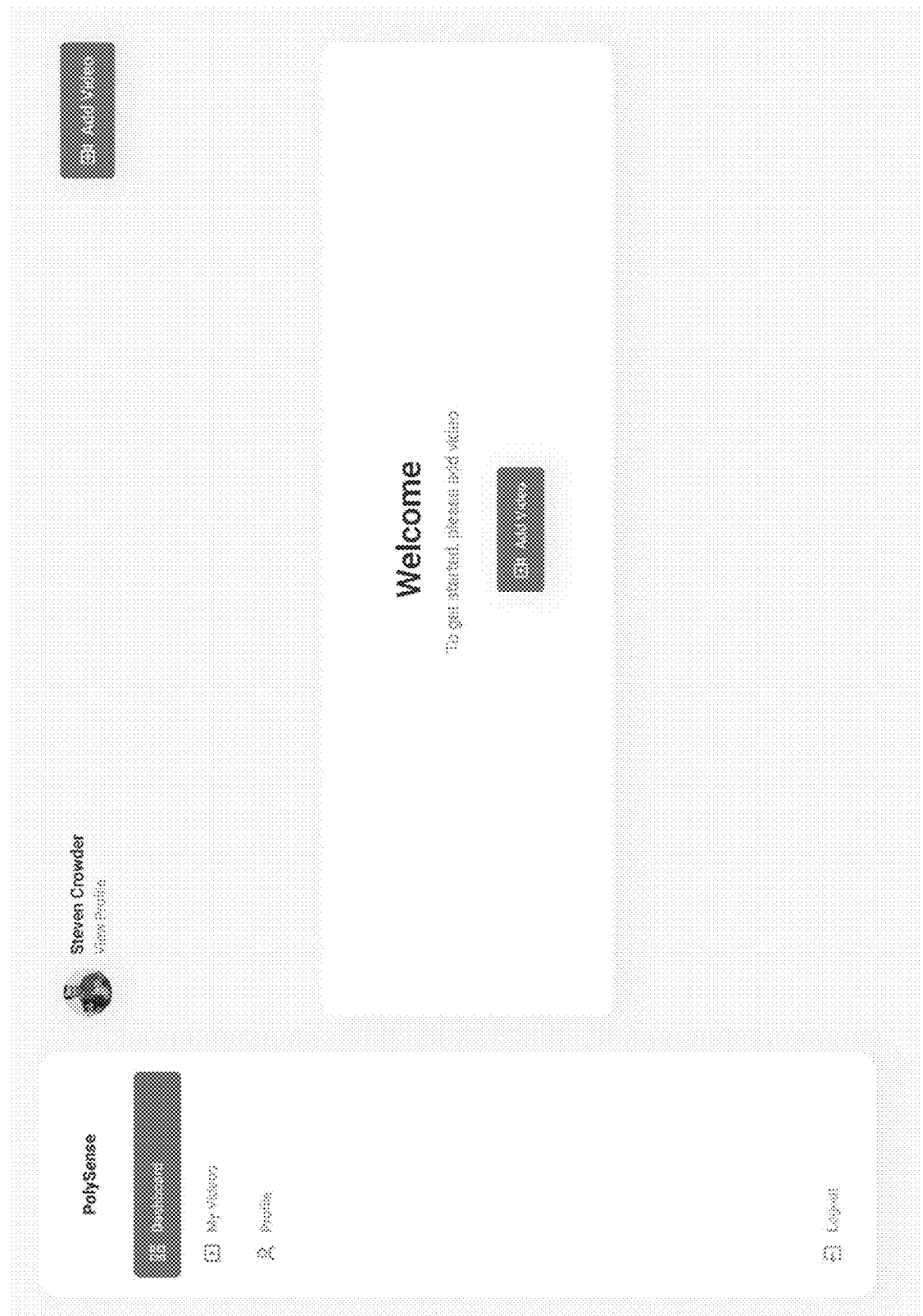
FIG. 3 illustrates a home page according to one embodiment of the present invention.
Figure 4:
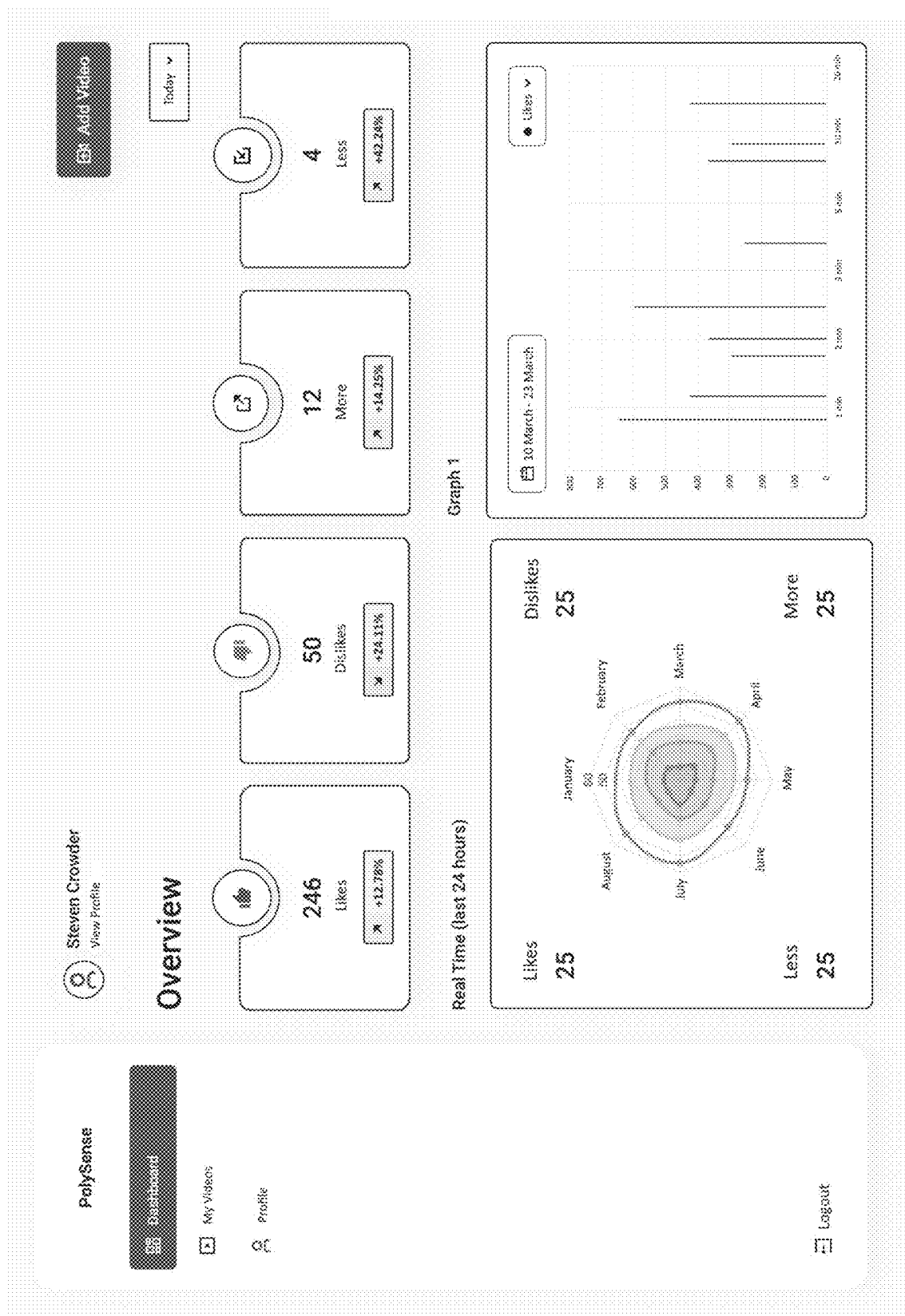
FIG. 4 illustrates a home page according to one embodiment of the present invention.

FIG. 3 illustrates a home page according to one embodiment of the present invention. When a user successfully logs in, the system is operable to generate a home page for the user's profile. In one embodiment, the home page includes an option to view the user's list of created content (e.g. images, recorded videos, songs, etc.), an option to view the user's profile, an option to add new content to the profile, an avatar for the profile, and/or an option to log out of the profile. As shown in FIG. 4, the profile is associated with existing content, the system is operable to display the total number of sentiments provided for all of the existing content, a graphical representation of the number of sentiments provided for the existing content over time, and/or the number of viewers of the existing content over time. In another embodiment, the system is operable to receive a selection from the user of what graphics will display on the home page. For example, the system is able to receive a selection to display a graph of the total number of sentiments received at a plurality of time stamps for existing videos associated with the profile. In yet another embodiment, the system is operable to receive a selection regarding the timescale of results to view on the home page. For example, the system is operable to display the total number of sentiments on the current day, over the past three days, over the past week, over the past month, over the past three months, over the past year, over the past three years, over the past five years, and/or all time.

In one embodiment, the system tracks sentiments falling into at least four categories. In one embodiment, the sentiments tracked include like, dislike, desire for more similar content, and desire for less similar content. In another embodiment, sentiments track include disgust, fear, love, sadness, anger, happiness, thoughtfulness, confusion, desire for more older content, boredom, arousal, anxiety, admiration, excitement, nostalgia, and/or surprise. The system is able to receive a plurality of sentiments from each viewer, including multiple of the input at different times during a video and/or in reaction to different content. In one embodiment, the system automatically limits the number of sentiments that a viewer is able to provide if the number of sentiments over time passes over a preset threshold. Limiting the number of sentiments is useful for ensuring that abuse of sentiments is decreased. In one embodiment, in addition to keeping track of the number of sentiments from each user, the system also tracks the points during a video and/or song at which the sentiments are expressed. In one embodiment, the system is also operable to determine the average amount of time spent on each piece of content and the time point during the content wherein a substantial number of viewers shift away from or close the content.

In one embodiment, sentiments are input into the system by a user device. In another embodiment, sentiments are automatically determined for a user based on physiological data for the user gathered by one or more sensors connected to a user device.

Figure 5:
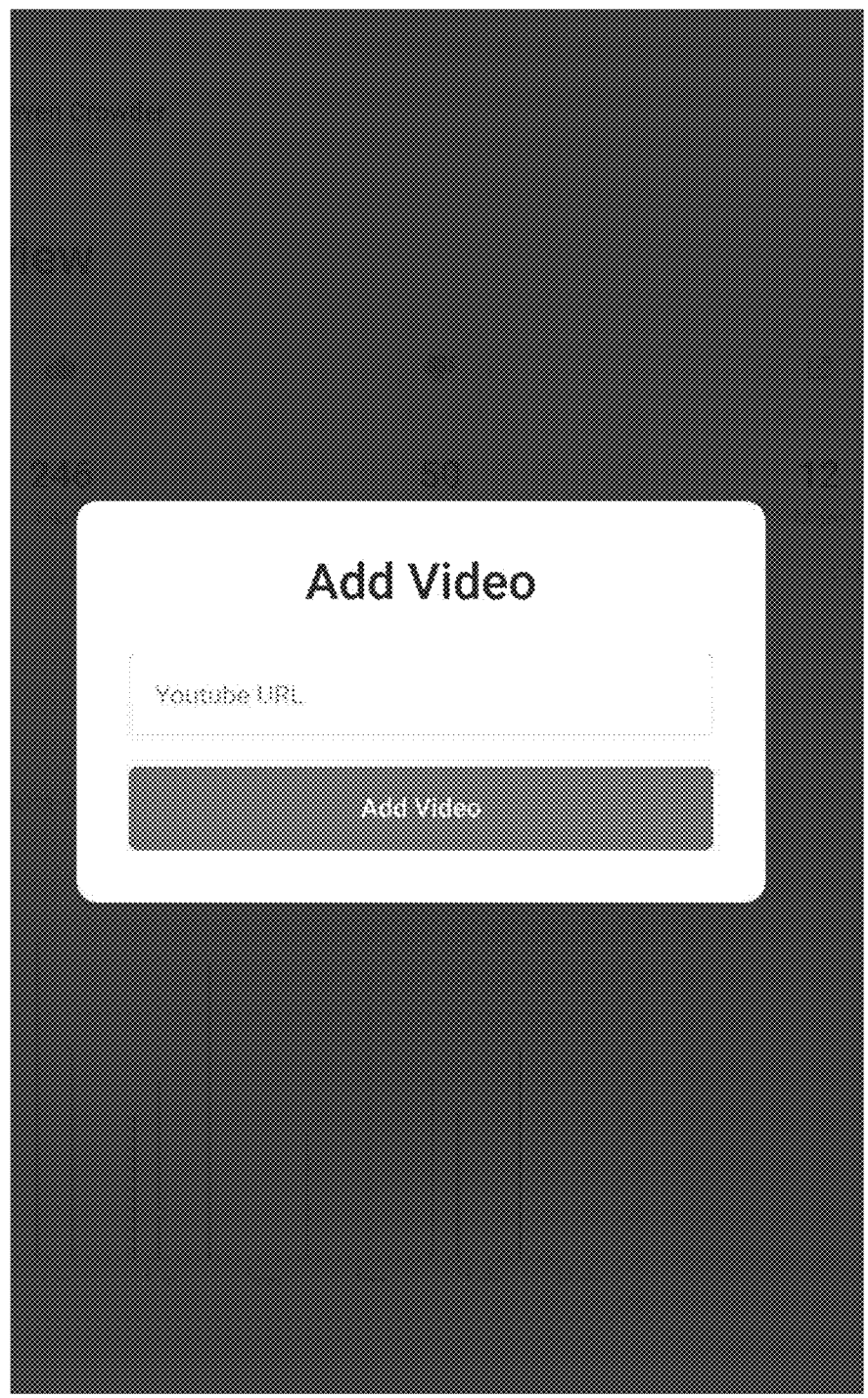
FIG. 5 illustrates a content addition page according to one embodiment of the present invention.

FIG. 5 illustrates a content addition page according to one embodiment of the present invention. The system allows a user to input a link to a third-party website URL and/or direct attachment of a content item, which the system then adds to the content on a user's profile. In one embodiment, if the user inserts a link to a third-party website, the system verifies that the profile that posted the content on the third-party website is also owned by the user before the content is added to the user's profile. In one embodiment, once the system has verified that a profile on a third-party website is associated with the same user, the system is operable to share data with the third-party website. Sharing that with the third-party website assists in some cases with receiving the maximum amount of data possible regarding the content. In one embodiment, the system is operable to retrieve other data from third party websites as well, including weather data, geolocation data, and/or demographic data regarding viewers and/or content creators. Each type of data is able to associated and correlated with data generated by the system. For example, time data for sentiments expressed to a particular item of content is able to be associated with weather data for a particular geolocation.

Figure 6:
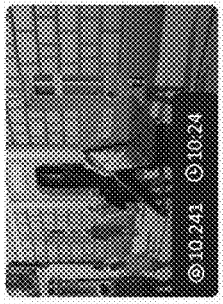
FIG. 6 illustrates a content overview page in a grid view according to one embodiment of the present invention.
Figure 7:
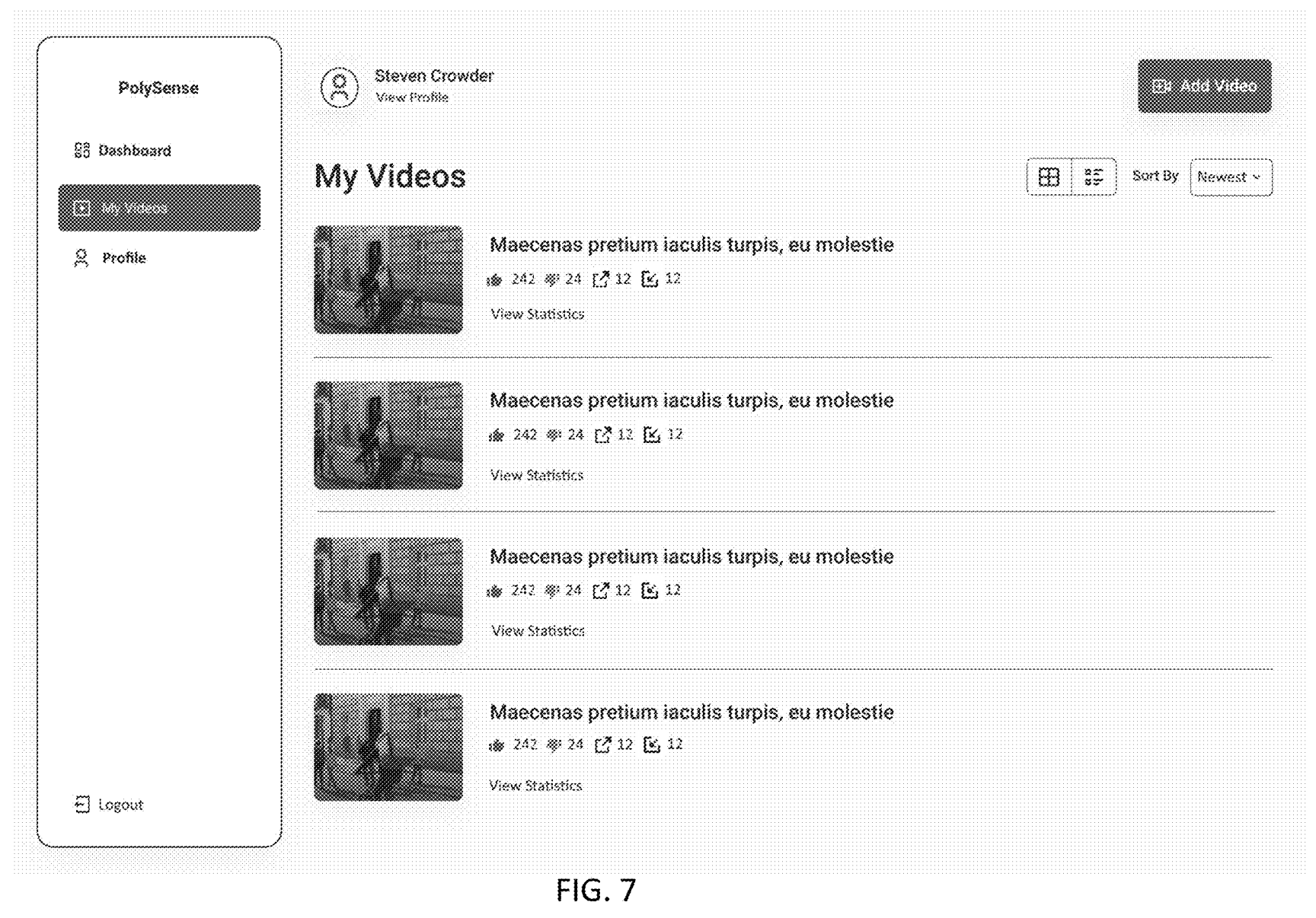

FIG. 6 illustrates a content overview page in a grid view according to one embodiment of the present invention. The content overview page includes a listing of all the content associated with a user's profile. In one embodiment, the content overview page further includes at least one thumbnail associated with each item of content and/or a listing all sentiments that have been expressed regarding each item of content. In one embodiment, the system is operable to receive a selection of a grid view or a list view. When items are displayed in a grid view, as shown in FIG. 6, multiple items are shown on each line, while items in a list view, as shown in FIG. 7 are displayed one per line. In one embodiment, the system provides for click selection of each item of content, which generates a content analytics page for the selected item.

Figure 8:
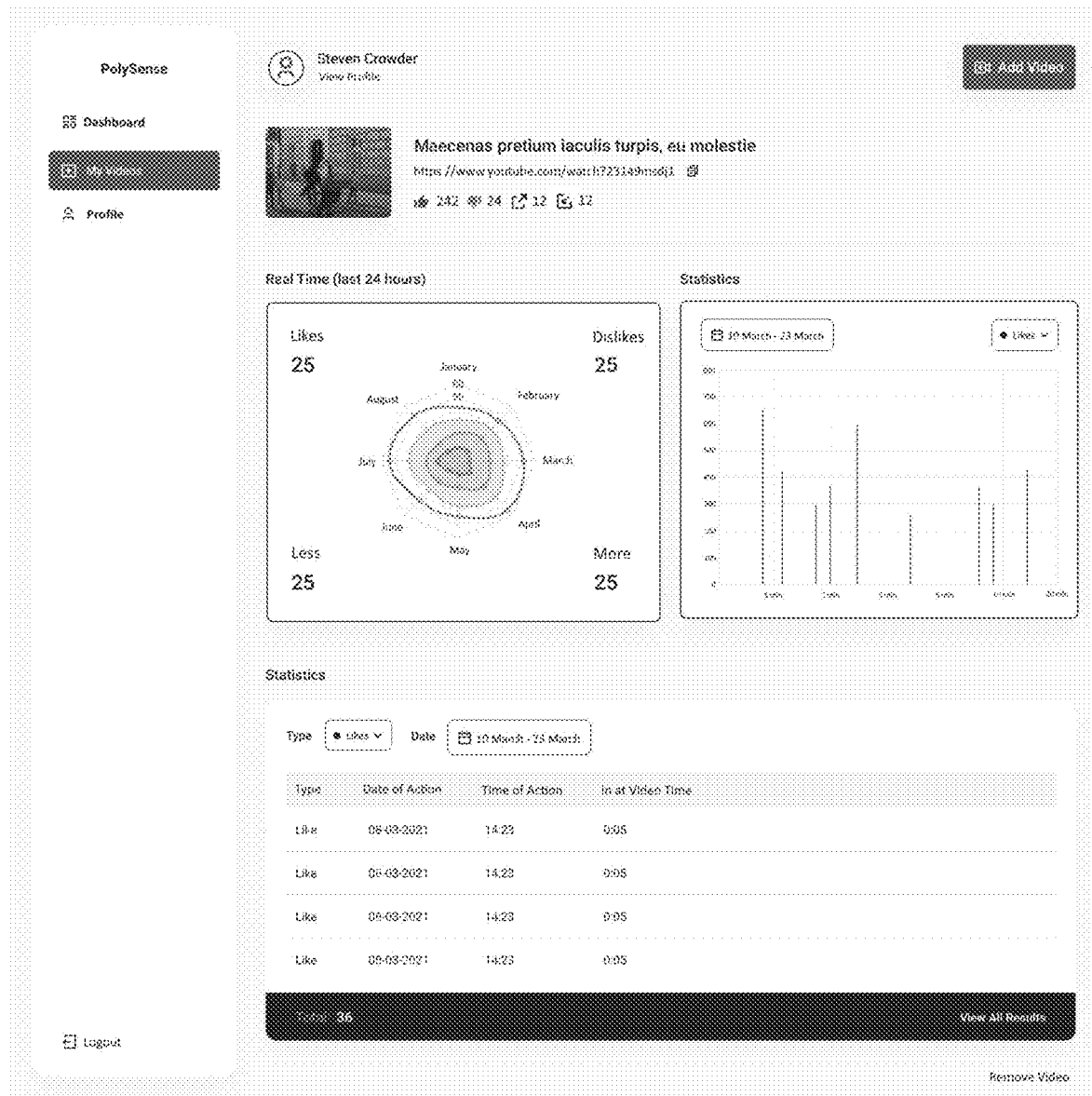
FIG. 8 illustrates a content analytics page according to one embodiment of the present invention.

FIG. 8 illustrates a content analytics page according to one embodiment of the present invention. The content analytics page provides information regarding how users are experiencing an individual item of content. In one embodiment, the content analytics page includes a total number of sentiments expressed for the content, a number of sentiments expressed for the content over time (e.g., over the last 24 hours, over the past months, over the past year, etc.), and/or a list of all sentiments provided along with an associated date, time, and/or time during the video when the sentiment was expressed. In one embodiment, the system enables a user to sort and/or filter the sentiments expressed for the content based on the type of sentiment expressed. In another embodiment, the system enables a user to sort and/or filter the sentiments expressed for the content based on a range of time for a video during which the sentiments were expressed. Filtering by a range of time enables a content creator to see how users responded on average to individual segments of a video, which is especially useful when a content creator is trying out a new style of video and/or song, and/or adding a new segment to a video.

Figure 9:
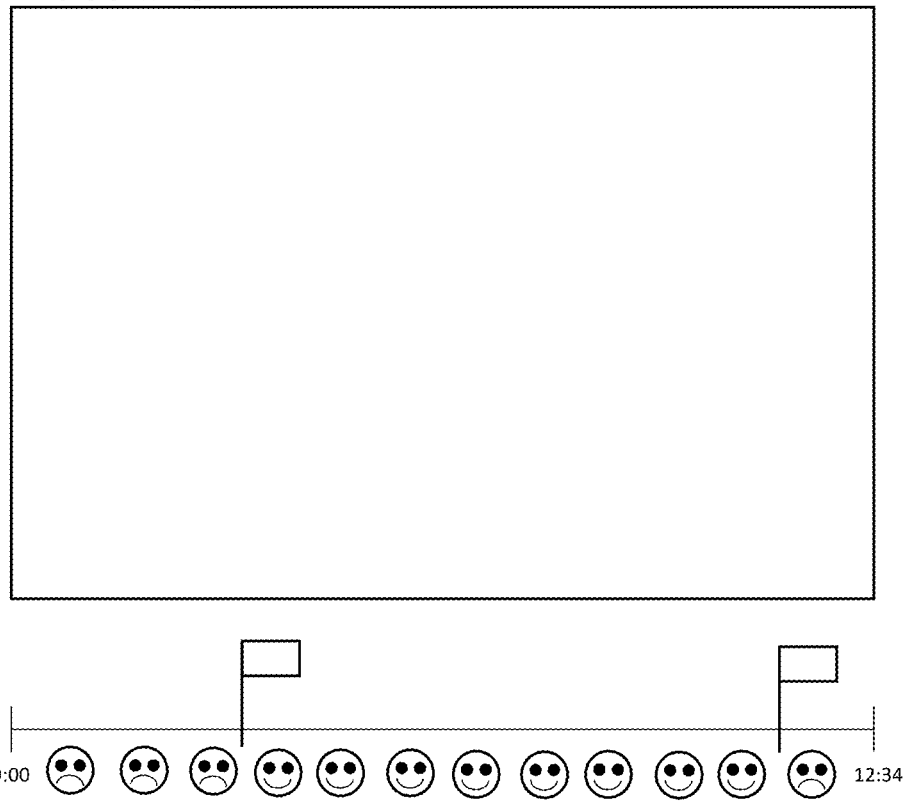
FIG. 9 illustrates a video playback module according to one embodiment of the present invention.

As shown in FIG. 9, in one embodiment, the system is operable to determine the points during a video and/or song wherein the audience experiences the greatest shifts in sentiments. Shifts in sentiment is defined either as the rate of increase or decrease of a particular sentiment, and/or the rate of change of the dominant sentiment (or, for example, the top three sentiments). For example, if the predominant sentiment before a particular time point of an item of content is "dislike," and the predominant sentiment after a particular time point is "like," then the system will provide a notification of a point of interest in the item of content. In one embodiment, the system displays the run time of a video and/or song along a line with flags indicating points of interest throughout the video and/or song.

Figure 10:
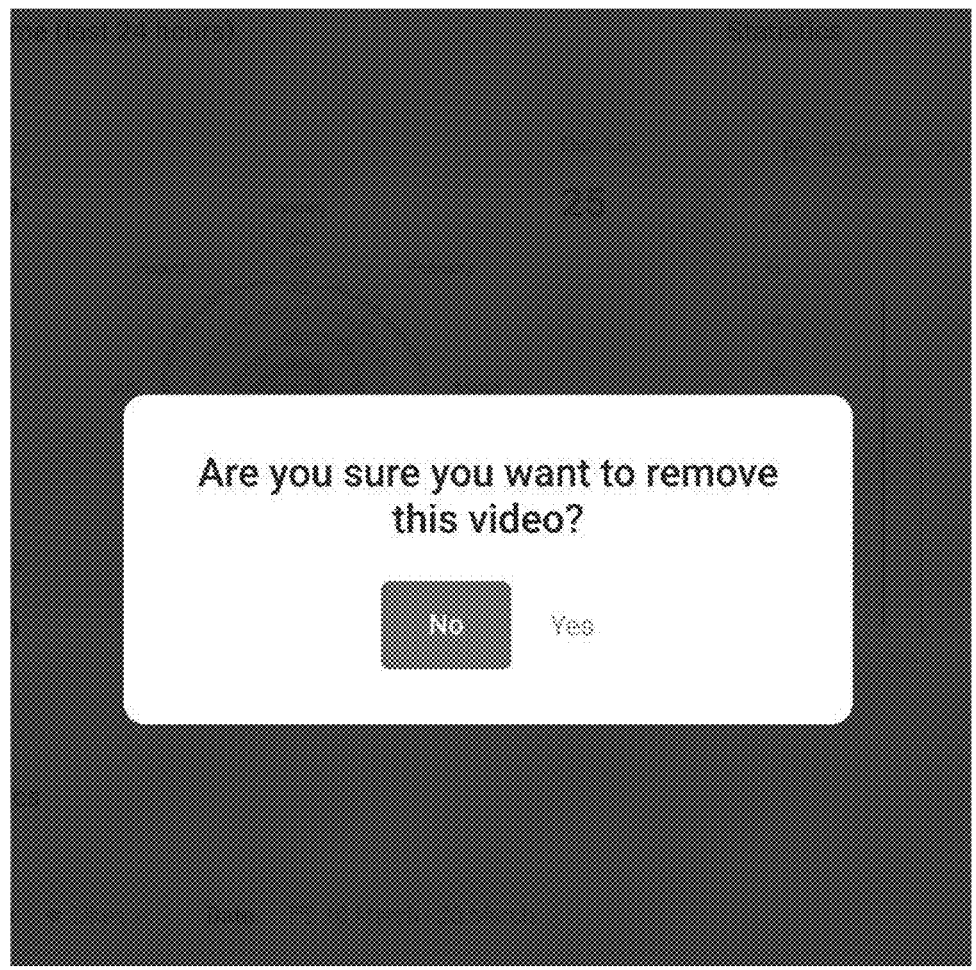
FIG. 10 illustrates a content removal page according to one embodiment of the present invention.

FIG. 10 illustrates a content removal page according to one embodiment of the present invention. The system enables users to delete content associated with the profile. In one embodiment, when the system receives a selection to delete content, the system prompts the user with a content removal page, which verifies that the user wants to remove the content. By prompting to verify that the user wants to remove the content, the system better prevents accidental deletion of content due to misclicks or other mistakes.

Figure 11:
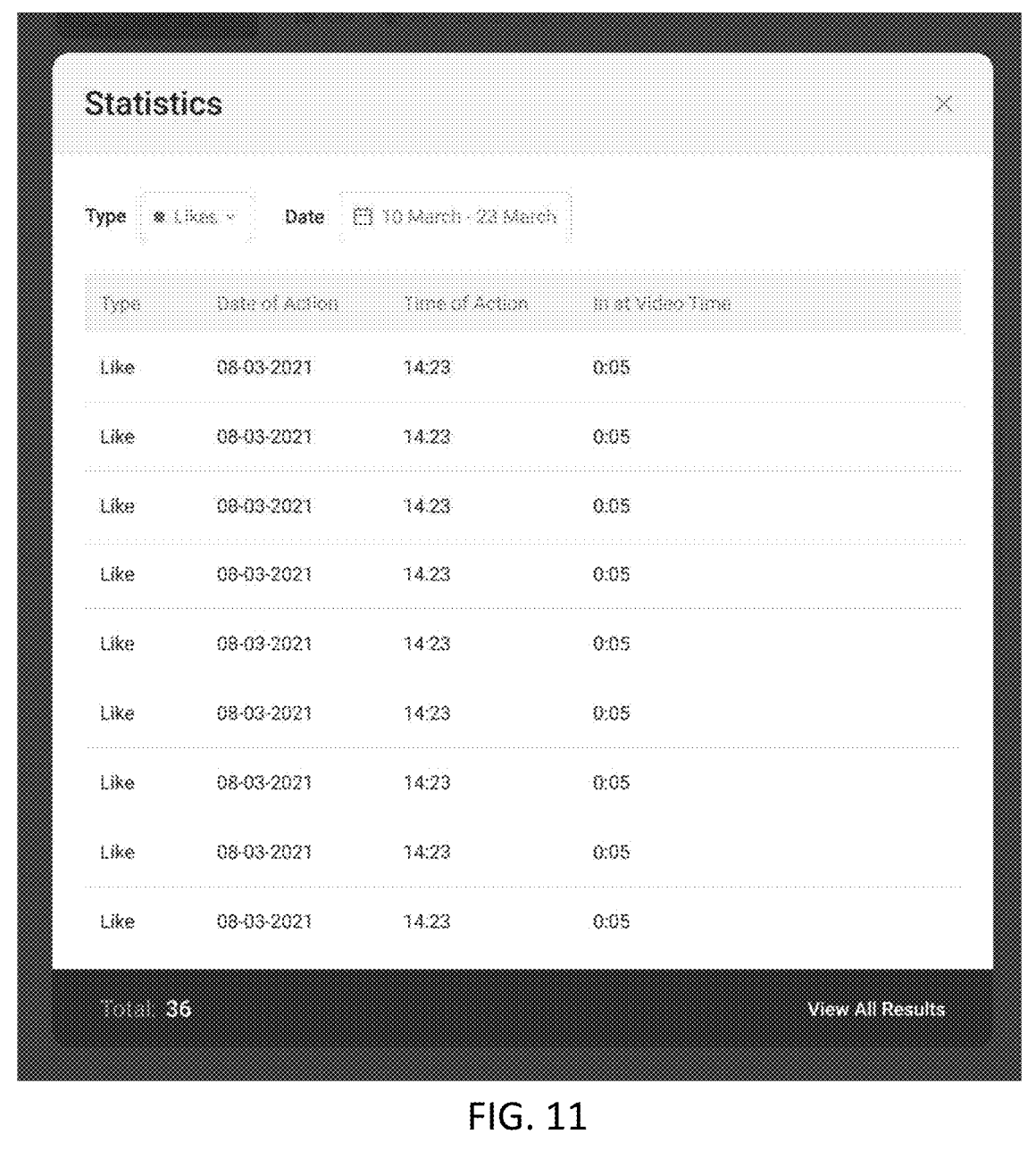

FIG. 11 illustrates a sentiment detail page according to one embodiment of the present invention. In one embodiment, the system allows a user to more closely examine the sentiments expressed with regard to all of the content associated with their profile and/or individual items of content associated with their profile. In one embodiment, the sentiment detail page includes a list of all sentiments provided along with an associated date, time, and/or time during the video when the sentiment was expressed. In one embodiment, the system enables a user to sort and/or filter the sentiments expressed for the content based on the type of sentiment expressed. In another embodiment, the system enables a user to sort and/or filter the sentiments expressed for the content based on a range of time for a video during which the sentiments were expressed. Filtering by a range of time enables a content creator to see how users responded on average to individual segments of a video, which is especially useful when a content creator is trying out a new style of video and/or song, and/or adding a new segment to a video. The sentiment detail page provides a total number of sentiments associated with the selected sentiments filters.

Figure 12:
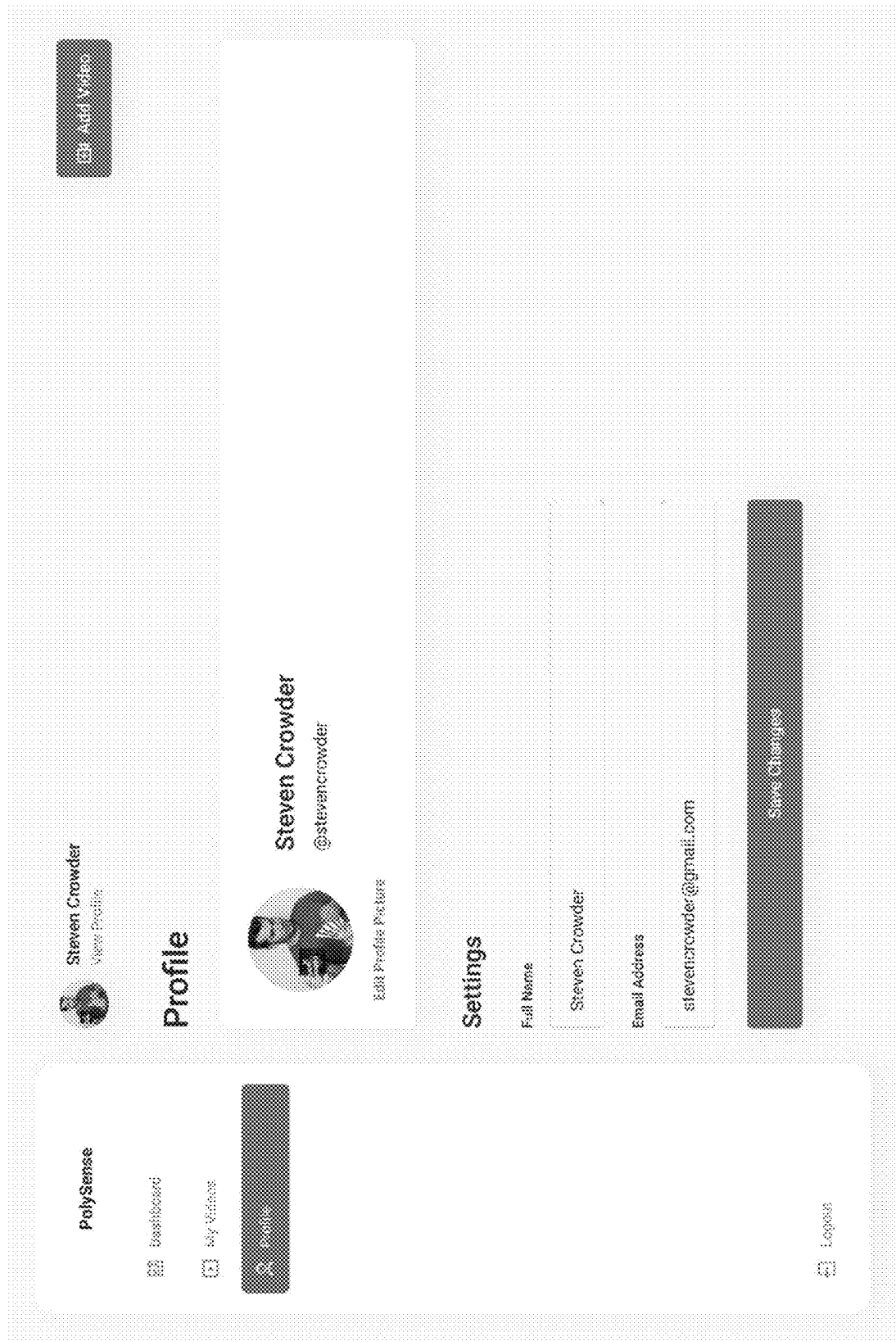
FIG. 12 illustrates a profile page according to one embodiment of the present invention.

FIG. 12 illustrates a profile page according to one embodiment of the present invention. In one embodiment, the system allows a user to edit at least one profile picture and/or avatar, at least one name associated with the profile, at least one method of communication associated with the profile (e.g. an email address), and/or other log-in information for the profile. In one embodiment, changes are made to the profile when the system receives a selection to save the changes to the profile by a user.

Figure 13:
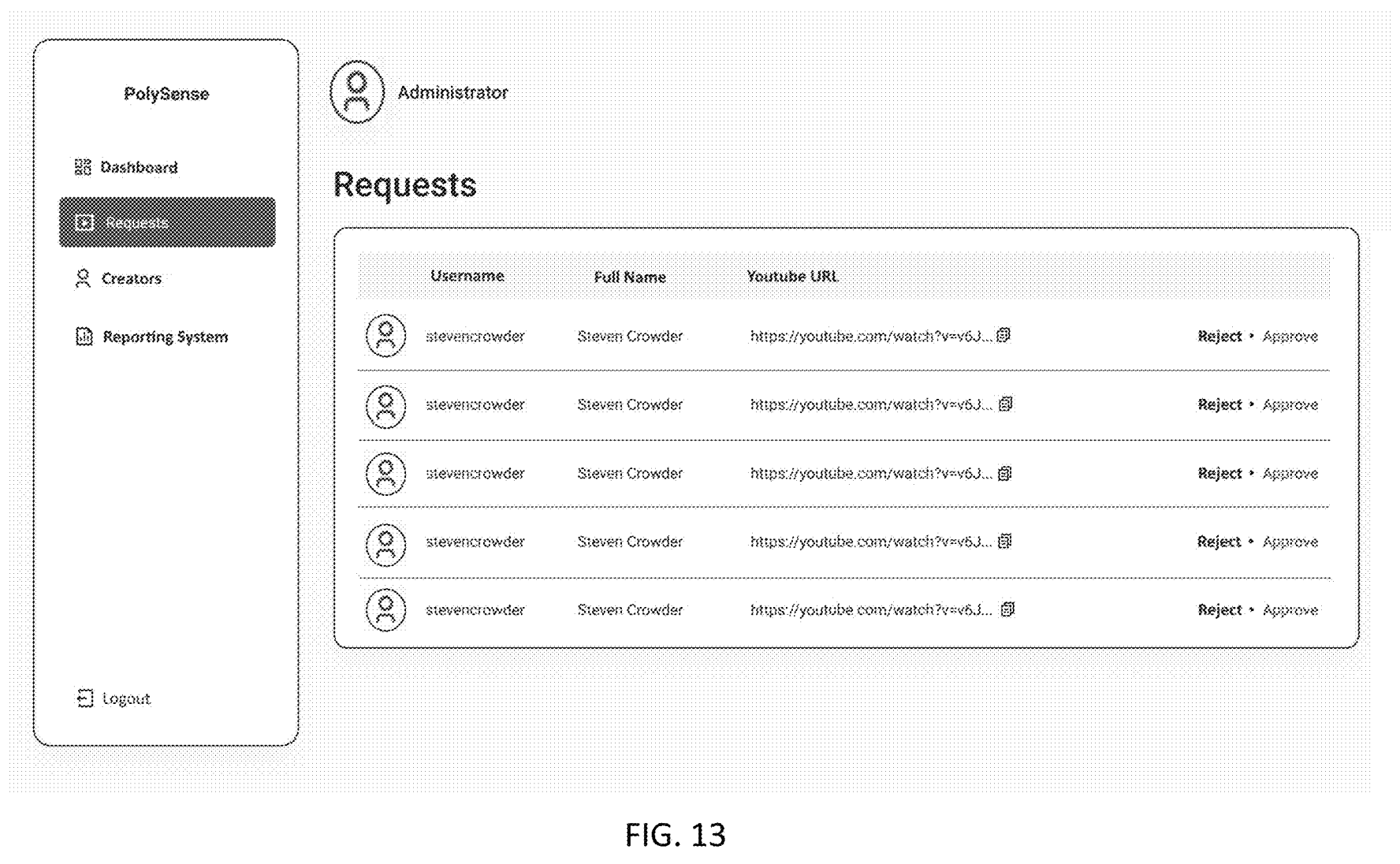
Figure 14:
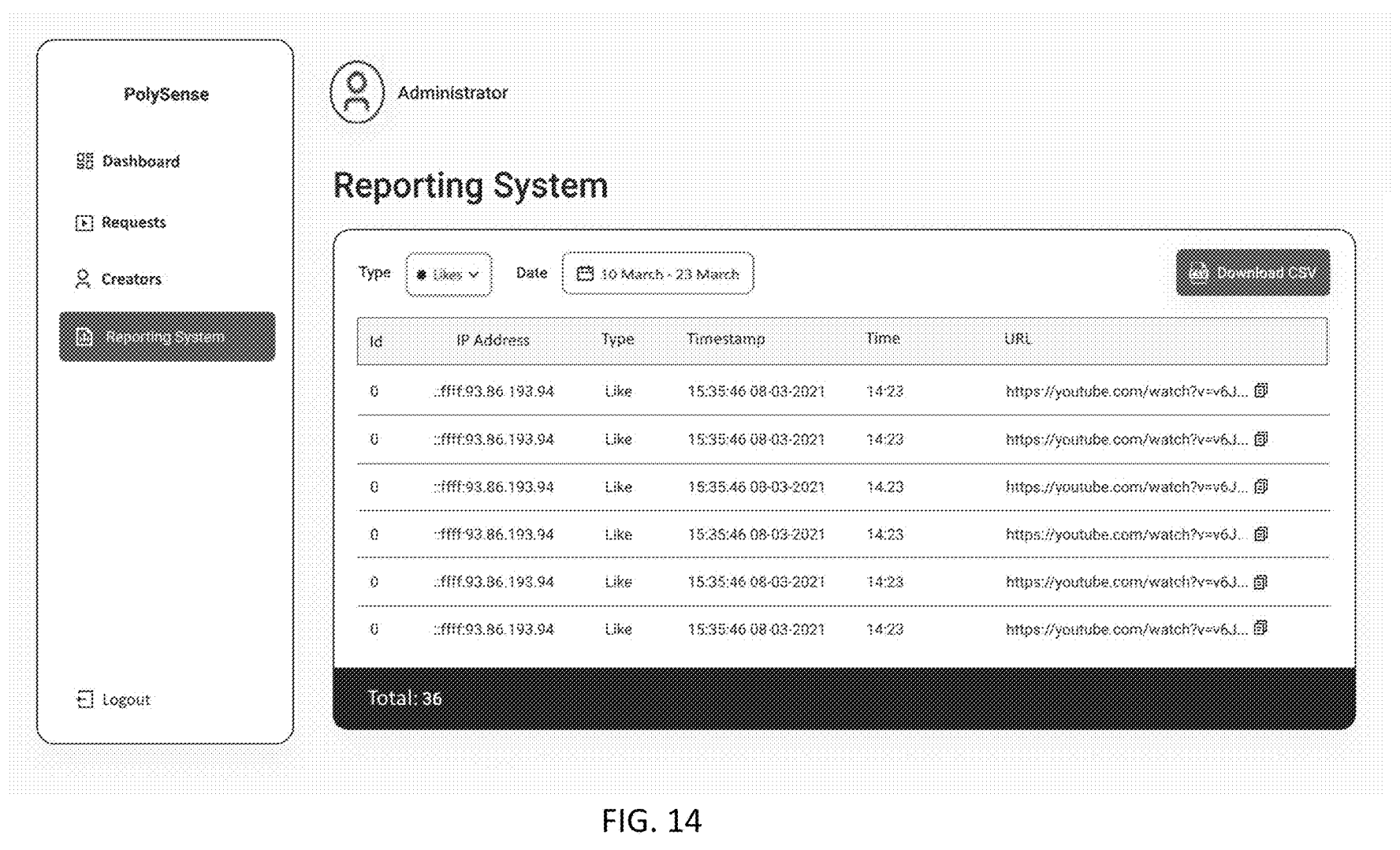

FIGS. 13-14 illustrate administrator pages according to one embodiment of the present invention. In one embodiment, an administrator page allows a user to designate at least one type of data to be displayed (e.g. number of likes, number of dislikes, time, date, etc.) in addition to at least one manner of display (e.g. bar graph, pie chart, time series, etc.). The system is operable to automatically generate the at least one manner of display including the at least one type of data to be displayed.

In one embodiment, the system includes at least one artificial intelligence module. Based on the sentiment data received for each content item, the artificial intelligence module is operable to determine at least one content topic and/or content theme that evokes one or more sentiments from the content creator's audience. By way of example and not limitation, in one embodiment, the artificial intelligence module recognizes that featured artist rap interludes on songs for one recording artist evoke a substantially higher number of dislike sentiments than other sections of a song. In another embodiment, the artificial intelligence module recognizes that content items concerning world politics or sections of content items concerning world politics evoke a higher percentage of "like" sentiments than content items concerning domestic politics or sections of content items concerning domestic politics.

In one embodiment, the system includes an overall administrator, who is operable to view data regarding the content produced by any and all content creators on the system. The overall administrator is also operable to designate at least one type of data to be displayed and at least one manner of display, and the system will automatically generate the at least one manner of display including the at least one type of data to be displayed.

In one embodiment, the system includes a content overlay application. In one embodiment, the content overlay application is a downloadable application, while in another embodiment it is an extension to an existing web browser. When a user visits a particular content page (e.g. a YouTube video page), the user is able to launch the content overlay application and associate the content overlay application with the particular content page. The content overlay application provides the ability to select from a set of reactions (for example, "like," "dislike", "more," and "less") based on the user's reaction to the associated content page. The content overlay application automatically adds any reaction to a blockchains-based database. In one embodiment, user reactions to a particular content page are only saved with respect to that page. In another embodiment, the system automatically detects when the same content is included on multiple different pages (e.g. the same video is uploaded to two different sites) and automatically aggregates reactions to the content from the multiple different pages for the same content.

In one embodiment, the system includes at least one distributed ledger, including but not limited to blockchains and/or at least one IOTA ledger. In one embodiment, sentiments expressed regarding a particular item of content are added to the blockchains. For videos and/or songs, metadata regarding the timestamp in which the sentiments were expressed is also recorded. In another embodiment, each item of content is also recorded on the blockchains, wherein information regarding the association of the item of content with a particular profile is also recorded on the blockchains. By adding sentiments, content, and other related data to blockchains, the system ensures security and consistency of the data. A single individual in the system, whether it be a member of the audience, a content creator, or a third party actor, is unable to alter and/or delete the data.

Blockchains technology is based on existing communication protocols (e.g., HTTP, RPC), cryptography (grown from Public key cryptography in 1976), distributed peer-to-peer sharing mechanisms (e.g., NAPSTER, BITTORRENT), and a distributed set of databases kept in synchronization based on time. The blockchains technology is a technology that permanently records events or transactions on a network in a transparent, auditable, and irrefutable way. A blockchain ledger is stored on each blockchain node participating in or comprising a network. Blockchain nodes include, but are not limited to servers, mobile devices, work stations, or any networked client that are able to interface with an IP-based network and are able to operate an operating system capable of processing blocks. Blockchains also disintermediate "middle men" such as broker dealers, banks, transfer agents, or any third party in information or transactions that are utilized for trust in the transmittal of data or the execution of a transaction. In an introduction to blockchain applications in The Business of Blockchain by William Mougayar (2016), which is incorporated herein by reference in its entirety, it is established that just as the Web could not exist without the Internet, blockchains could not exist without the Internet, and thus, the use of blockchains within the systems and methods of the present invention provide that it is not merely an abstract idea, since it is inextricably tied to Internet technology.

Figure 15:
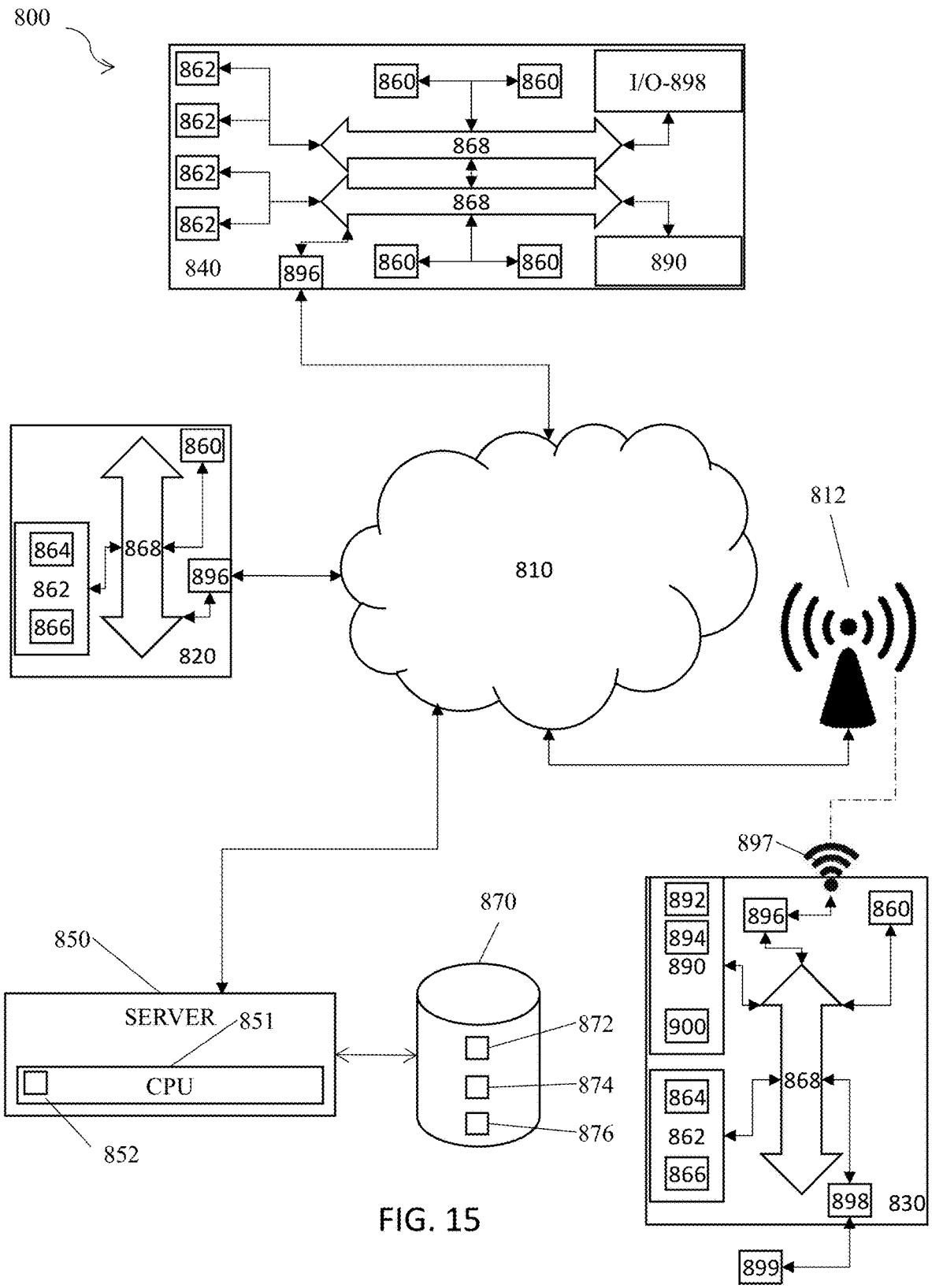
FIG. 15 is a schematic diagram of a system of the present invention.

FIG. 15 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that are able to perform calculations, process instructions for execution, and/or other manipulations of information.

In another implementation, shown as 840 in FIG. 15, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 15, is operable to include other components that are not explicitly shown in FIG. 15, or is operable to utilize an architecture completely different than that shown in FIG. 15. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A system for analyzing audience response to media, comprising:
   at least one node, each including a processor and a memory, in network communication with a plurality of user devices;
   wherein a digital overlay is generated over a media content item displayed on each of the plurality of user devices;
   wherein the at least one node is operable to receive sentiment data through the digital overlay from a subset of the plurality of user devices;
   wherein the at least one node is operable to update one or more distributed ledgers based on the sentiment data;
   wherein the at least one node is operable to transmit updates of the one or more distributed ledgers to the plurality of user devices; and
   wherein the sentiment data includes one or more of four sentiments expressed regarding the media content item, an identifier of the media content item, and at least one timestamp associated with the one or more of the four sentiments.

2. The system of claim 1, wherein the at least one node is connected to the plurality of user devices over one or more wireless personal area networks (WPANs) and/or one or more wireless local area networks (WLANs).

3. The system of claim 1, wherein the four sentiments include like, dislike, desire for more, and desire for less.

4. The system of claim 1, wherein the sentiment data includes physiological data automatically generated by at least one sensor attached to the plurality of user devices.

5. The system of claim 1, wherein the at least one node is operable to automatically determine a rate of change for each of the four sentiments over time.

6. The system of claim 1, wherein the media content item is a video, a song, an audio recording, and/or image.

7. The system of claim 1, wherein the digital overlay is generated by a web browser extension application on each of the plurality of user devices.

8. A system for analyzing audience response to media, comprising:
- at least one node, each including a processor and a memory, in network communication with a plurality of user devices;
- wherein a digital overlay is generated over at least one media content item displayed on each of the plurality of user devices;
- wherein the at least one node is operable to receive sentiment data through the digital overlay from a subset of the plurality of user devices;
- wherein the at least one node is operable to update one or more distributed ledgers based on the sentiment data;
- wherein the at least one node is operable to transmit updates of the one or more distributed ledgers to the plurality of user devices;
- wherein the sentiment data includes one or more of four sentiments expressed regarding the at least one media content item; and
- wherein an artificial intelligence module is operable to indicate popular content topics for each creator of the at least one media content item based on the sentiment data.

9. The system of claim 8, wherein the at least one node is connected to the plurality of user devices over one or more wireless personal area networks (WPANs) and/or one or more wireless local area networks (WLANs).

10. The system of claim 8, wherein the four sentiments include like, dislike, desire for more, and desire for less.

11. The system of claim 8, wherein the sentiment data includes physiological data automatically generated by at least one sensor attached to the plurality of user devices.

12. The system of claim 8, wherein the at least one node is operable to automatically determine a rate of change for each of the four sentiments over time.

13. The system of claim 8, wherein the at least one media content item includes at least one video, at least one song, at least one audio recording, and/or at least one image.

14. The system of claim 8, wherein the digital overlay is generated by a web browser extension application on each of the plurality of user devices.

15. The system of claim 8, wherein the at least one node further receives geolocation data associated with the sentiment data from the subset of the plurality of user devices.

16. The system of claim 8, wherein the at least one node automatically rejects sentiment data from a particular user device for a limited amount of time if a volume of sentiments received from the particular user device exceeds a preset threshold within a preset time window.

17. A system for analyzing audience response to media, comprising:
- at least one node, each including a processor and a memory, in network communication with a plurality of user devices;
- wherein a digital overlay is generated over a media content item displayed on each of the plurality of user devices;
- wherein the at least one node is operable to receive sentiment data through the digital overlay from a first subset of the plurality of user devices;
- wherein the at least one node is operable to update one or more distributed ledgers based on the sentiment data;
- wherein the at least one node is operable to transmit updates of the one or more distributed ledgers to the plurality of user devices;
- wherein the sentiment data includes one or more of four sentiments expressed regarding the media content item; and
- wherein the sentiment data includes physiological data automatically generated by at least one sensor attached to the plurality of user devices.

18. The system of claim 17, wherein the at least one node are connected to the plurality of user devices over one or more wireless personal area networks (WPANs) and/or one or more wireless local area networks (WLANs).

19. The system of claim 17, wherein the media content item is a video, a song, an audio recording, and/or image.

20. The system of claim 17, wherein the four sentiments include like, dislike, desire for more, and desire for less.

* * * * *